(No Model.) 2 Sheets—Sheet 2.
F. J. SPRAGUE.
ELECTRIC RAILWAY SYSTEM.
No. 321,149. Patented June 30, 1885.
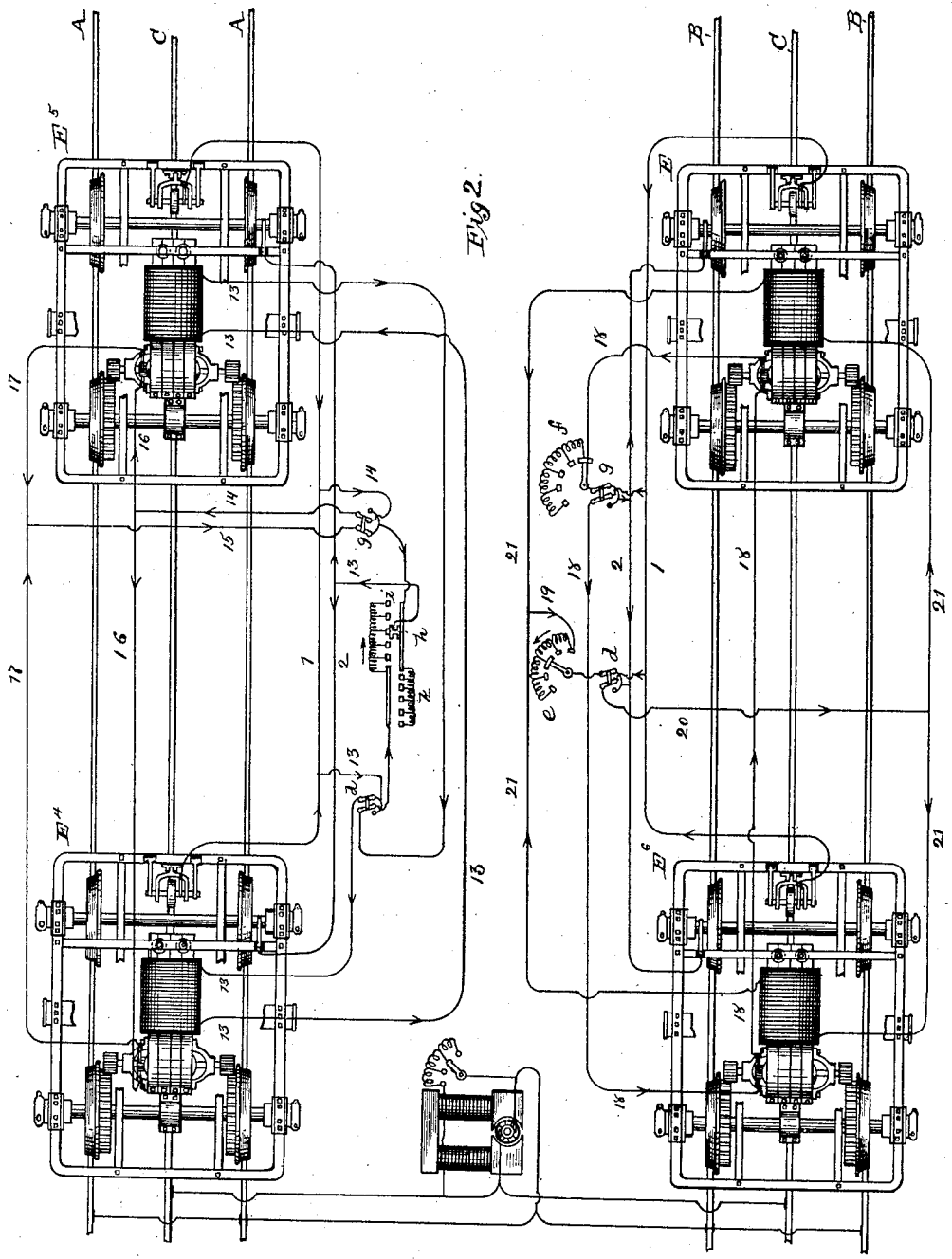

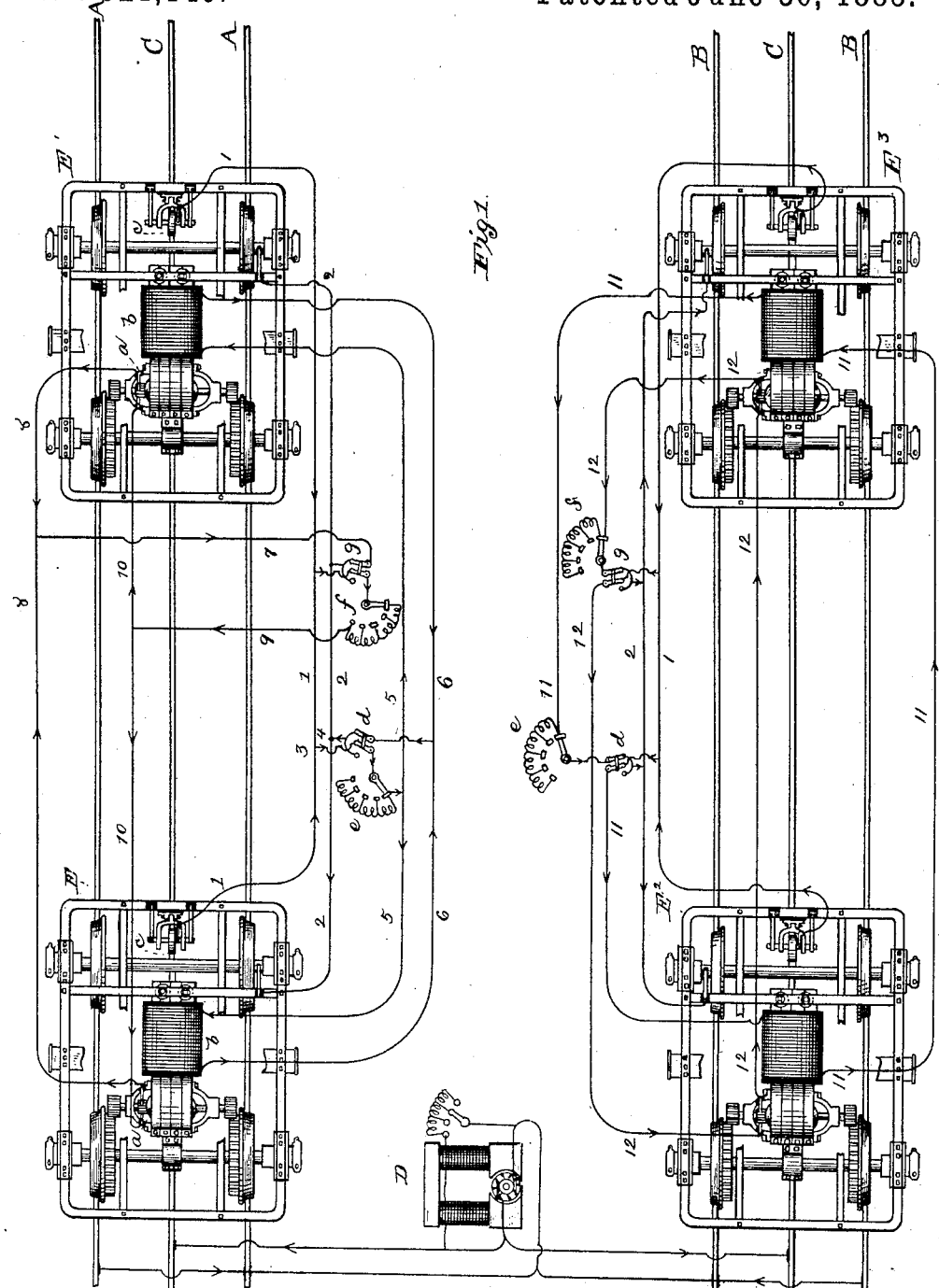

UNITED STATES PATENT OFFICE.

FRANK J. SPRAGUE, OF NEW YORK, N. Y., ASSIGNOR TO THE SPRAGUE ELECTRIC RAILWAY AND MOTOR COMPANY.

ELECTRIC RAILWAY SYSTEM.

SPECIFICATION forming part of Letters Patent No. 321,149, dated June 30, 1885.

Application filed March 21, 1885. (No model.)

*To all whom it may concern:*

Be it known that I, FRANK J. SPRAGUE, of New York, in the county and State of New York, have invented a certain new and useful Improvement in Electric Railway Systems, of which the following is a specification.

The object of this invention is to regulate simultaneously the strength of the field-magnets of several—two or more—electro-dynamic motors acting together to propel a car or a train of cars upon a railway-track, and to regulate independently of such field regulation the armature-current of both or all said motors simultaneously. There are several ways in which the motors may be arranged and connected to accomplish this. That which I prefer is to connect the several armatures in multiple-arc relation to each other or one another and the several field-magnets in the same manner, all the field-magnets being in shunt relation to all the armatures. A current-regulator, preferably an adjustable resistance, is placed in the field-magnet shunt, and another in the armature-shunt, and by the separate adjustment of these resistances the armatures and field-magnets are regulated independently. Preferably, also, a circuit-reverser is placed in the armature-circuit and another in the field-circuit. Instead of this, the armatures may be in series with each other and the field-magnets in multiple arc to each other, or the field-magnets may be in series and the armatures in multiple arc, or the field-magnets may be in series and the armatures also in series. In any case the field-magnets and the armatures are in shunt relation to each other, and an adjustable resistance or other current-regulating device is placed in each shunt. This independent regulation of field-magnets and armatures is desirable, because in starting a motor it is best to start with a strong field-magnet and a controllable current in the armature-circuit, so that the motor starts very slowly with a strong rotary effort, and then to gradually cut out the armature-resistance to keep up the armature-current as the counter electro-motive force is set up, until the whole resistance is cut out and full potential exists at the armature-circuit terminals, and then to gradually decrease the strength of the field-magnet to bring the speed up to the desired point, and when the motor is running its speed is regulated by varying the field without affecting the armature-circuit, and in other cases it is desirable to regulate the armature-circuit without affecting the field-magnet strength. In addition the fields must be regulated without affecting the armatures, in order to carry into effect the method of breaking set forth in my application, Serial No. 150,899, in which the strength of a field-magnet is increased until the counter electro-motive force developed by the armature of the motor exceeds the initial electro-motive force on the line.

Where several motors are placed upon the same car or train of cars, they should be regulated together, so that they may all maintain the same speed.

My invention is illustrated in the accompanying drawings, in which Figures 1 and 2 are diagrams of electric railway systems embodying said invention.

A A represents one track, and B B another, of an electric railway line. Each track has an intermediate rail, C, which intermediate rails forms one side of the circuit, while the working rails and the ground form the other side. Both tracks are supplied with current from a single source, D. In Fig. 1, upon the track A A are two electro-dynamic motors, E and E'. These motors are shown as mounted upon separate trucks, which may be trucks of the same car or of different cars of the same train.

The mechanical arrangements and connections shown for the motors form no part of my present invention, but will be particularly described and claimed in another application for Letters Patent.

In each motor $a$ is the armature, and $b$ the field-magnet, and $c$ is a contact-roller for taking current from the intermediate rail.

The circuits of the two motors E E' are as follows: A main wire, 1, runs from the contact-roller $c$ of one motor to that of the other, and a main wire, 2, from a brush resting on the axle of one motor to a similar brush on the other. Thus these wires 1 and 2 form the two sides of the circuit for both motors. From conductor 1 extends a wire, 3, and from conductor 2 a wire, 4. Wire 3 runs to conductors 5 5, which extend each to a terminal of one of the motor field-magnets; and wire 4 is connected to wires 6 6, which extend, respectively, to the other field-magnet terminals. Thus the two field-magnets are connected in multiple arc between wires 3 and 4. A circuit-reverser, $d$, is connected with wires 3 and 4, so that the current in the field-magnets is reversed, and in wire 3 is interpolated an adjustable resistance, $e$, whereby the current energizing both field-magnets is varied to regulate the strength of the two magnets simultaneously without affecting the armature-circuit of the motors.

From wire 1 extends also a wire, 7, which is connected with wires 8 8 extending each to a commutator-brush of one of the motors; and from wire 2 wire 9 extends to wires 10 10, which go to the other commutator-brushes. The armatures of the two motors are thus placed in multiple arc to each other like the two field-magnets, and the two armatures are in shunt relation to the two field-magnets.

In wires 7 and 9 are placed a circuit-reverser, $f$, and an adjustable resistance, $g$, whereby the current of the two armatures is regulated and reversed without affecting the strength of the field-magnets. The resistances are shown in the position for starting the motor, all the resistance being cut out of the field-circuit, and the full resistance being in the armature-circuit.

On the track B B are motors $E^2$ $E^3$. The main wires 1 2 are arranged as before. From one to the other extends a circuit, 11 11, which includes in series the field-magnets of both motors, and also a circuit, 12 12, which includes both armatures in series. In circuit 11 are placed the adjustable resistance $e$ and circuit-reverser $d$, whereby both field-magnets are simultaneously varied or reversed; and in circuit 12 are the resistance $f$ and reverser $g$, whereby the current of both armatures is controlled, the regulation of each circuit being independent of that of the other. As shown in the drawings, there is no resistance in either circuit, there being thus full potential at the armature terminals and weak field-magnets.

On track A A, Fig. 2, are motors $E^4$ $E^5$. From wire 1 a wire, 13, extends, which includes both field-magnets in series, and returns to wire 2; and from wire 1 extends also a wire, 14, and from wire 2 a wire, 15, including a part of wire 13. Wire 14 is connected with wires 16 16, which go to commutator-brushes of the two motors; and wire 15 goes to wires 17 17, which extend to the other commutator-brushes. Thus the two armatures are in multiple arc to each other and in shunt relation to the two field-magnets in series. The circuit-reverser $g$ is in the armature circuit and reverser $d$ in the field-circuit. In this figure is shown the form of adjustable resistance set forth in my application, Serial No. 157,699, wherein the same contact-arm $h$ is moved successively along the field resistance-contacts $i$, and the armature resistance-contacts $k$, whereby the armature may be first increased and the field then weakened after the motor is started. In this figure there is no resistance in the armature-circuit and a part of the whole resistance in the field-circuit.

The motors $E^6$ $E^7$, on the track B B, of Fig. 2, have their armatures in series and their field-magnets in multiple-arc. The armatures are in circuit 18 18, extending from 1 to 2, and the fields are in multiple-arc circuits 21 21, from wires 19 and 20, which extend from 1 and 2. Circuit-controlling devices are provided, as before. The position of the resistances in this case is the same as in that next preceding.

The circuit-reverser may be used to make and break the circuits in which they are placed. Where several motors are on the same train the circuits extend from one car to another, and the circuit-controlling devices for the whole train are placed in one car.

It is evident that any desired number of motors may be connected and arranged in any one of the several ways above explained.

Two motors may be placed on the same truck of a car, if desired.

What I claim is—

1. In an electric railway system, the combination of two or more motors mounted upon the same car or train of cars and propelling the same, and a current-regulator for simultaneously controlling the field-magnets of all said motors, substantially as set forth.

2. In an electric railway system, the combination of two or more motors mounted upon the same car or train of cars and propelling the same, a current-regulator for simultaneously controlling the field-magnets of all said motors, and a current-regulator for simultaneously controlling the current in the armatures of all said motors, substantially as set forth.

3. In an electric railway system, the combination of two or more motors mounted upon the same car or train of cars and propelling the same, a common field-circuit for said motors, and an adjustable resistance in said field-circuit, substantially as set forth.

4. In an electric railway system, the combination of two or more motors mounted upon the same car or train of cars and propelling the same, a field-circuit common to all said motors, and an adjustable resistance, and a circuit-reverser in said field-circuit, substantially as set forth.

5. In an electric railway system, the combination of two or more motors mounted upon the same car or train of cars and propelling the same, a common field-circuit for said motors, and a current-regulating device therein, a common armature-circuit and a current-regulating device therein, and means for reversing the direction of rotation of the motor, substantially as set forth.

6. In an electric railway system, the combination of two or more motors mounted upon the same car or train of cars and propelling the same, having their armatures in multiple-arc relation to each other and their field-magnets in shunt relation to the armatures, a current-regulating device common to all said armatures, and a current-regulating device common to all said field-magnets, substantially as set forth.

7. In an electric railway system, the combination of two or more motors mounted upon the same car or train of cars and propelling the same, having their field-magnets in multiple-arc relation to each other and their armatures in shunt relation to all the field-magnets, a current-regulating device common to all said field-magnets, and a current-regulating device common to all said armatures, substantially as set forth.

8. In an electric railway system, the combination of two or more motors mounted upon the same car or train of cars and propelling the same, having their field-magnets in multiple-arc relation to each other and their armatures in multiple-arc relation to each other, and all the field-magnets in shunt relation to all the armatures, a current-regulating device common to all the field-magnets, and a current-regulating device common to all the armatures, substantially as set forth.

9. In an electric railway system, the combination of two or more motors mounted upon the same car or train of cars and propelling the same, a common field-circuit for said motors, an adjustable resistance and a circuit-reverser therein, a common armature-circuit for said motors, and an adjustable resistance and a circuit-reverser therein, substantially as set forth.

This specification signed and witnessed this 19th day of March, 1885.

FRANK J. SPRAGUE.

Witnesses:
A. W. KIDDLE,
H. W. SEELY.